US009959266B2

(12) United States Patent
Burson

(10) Patent No.: US 9,959,266 B2
(45) Date of Patent: May 1, 2018

(54) PATTERN GENERATION FOR VIEWING DATA IN MULTIPLE DIRECTIONS

(71) Applicant: Nancy Burson, New York, NY (US)

(72) Inventor: Nancy Burson, New York, NY (US)

(*) Notice: Subject to any disclaimer, the term of this patent is extended or adjusted under 35 U.S.C. 154(b) by 327 days.

(21) Appl. No.: 14/818,574

(22) Filed: Aug. 5, 2015

(65) Prior Publication Data
US 2015/0339283 A1 Nov. 26, 2015

Related U.S. Application Data

(63) Continuation of application No. PCT/US2014/015366, filed on Feb. 7, 2014.

(60) Provisional application No. 61/761,926, filed on Feb. 7, 2013.

(51) Int. Cl.
G06F 15/00 (2006.01)
G06F 17/24 (2006.01)
G06F 3/0484 (2013.01)
G06T 11/40 (2006.01)

(52) U.S. Cl.
CPC .......... *G06F 17/245* (2013.01); *G06F 3/0484* (2013.01); *G06T 11/40* (2013.01)

(58) Field of Classification Search
CPC .... G06F 17/245; G06F 17/246; G06F 17/212; G06F 17/24; G06F 3/0484; G06T 11/40
USPC .......................................... 715/227
See application file for complete search history.

(56) References Cited

U.S. PATENT DOCUMENTS

| 5,745,660 A | * | 4/1998 | Kolpatzik | ............ H04N 1/4051 358/3.19 |
| 2003/0095135 A1 | * | 5/2003 | Kaasila | ................. G06F 3/0481 345/613 |
| 2006/0069635 A1 | * | 3/2006 | Ram | ..................... G06Q 30/08 705/37 |
| 2009/0242760 A1 | * | 10/2009 | Miyamoto | ......... G01N 23/2251 250/307 |

* cited by examiner

*Primary Examiner* — Scott T Baderman
*Assistant Examiner* — Hassan Mrabi
(74) *Attorney, Agent, or Firm* — Levisohn Berger LLP

(57) ABSTRACT

A computer implemented method and a device for generating a data pattern involve receiving user input of a plurality of ordered data elements. A processor of the computer determines how many of the data elements are required for filling in a row and a column of a predefined space. The processor then generates a data pattern by iteratively cycling through the data elements to select data elements for filling the space along a plurality of directions, until the space is filled.

20 Claims, 14 Drawing Sheets

PATTERN GENERATION FOR VIEWING DATA IN MULTIPLE DIRECTIONS

RELATED APPLICATIONS

This application is a continuation of pending International Patent Appl Ser. No. PCT/US2014/015366 having an international filing date of Feb. 7, 2014, which itself claims the benefit of U.S. Provisional Patent Application No. 61/761,926 filed Feb. 7, 2013, the contents of which are hereby incorporated by reference herein.

FIELD OF THE INVENTION

The present invention relates to a method and a device for generating data patterns.

BACKGROUND INFORMATION

Data is typically displayed to and interpreted by viewers in a one-dimensional, non-repetitive fashion. For example, English language text is a series of lines read from left to right, each line presenting new text information. Although useful for conveying large amounts of information, such display is not necessarily the most efficient, meaningful or aesthetically pleasing way to convey short pieces of information.

BRIEF DESCRIPTION OF THE DRAWINGS

FIG. 1 shows a data string repeated to fill an entire row, according to an example embodiment of the present invention.

FIG. 2 shows a data string repeated to fill a row and a column, according to an example embodiment of the present invention.

FIG. 3 shows a data string repeated to fill multiple rows and columns, such that the data string is readable diagonally, according to an example embodiment of the present invention.

FIG. 4 shows a data pattern in which a data string is repeated to completely fill a predefined number of rows and columns, according to an example embodiment of the present invention.

FIGS. 5, 6, 7A, 7B and 8 show masked data patterns, according to example embodiments of the present invention.

FIG. 12 shows a data pattern to which a three-dimensional filter has been applied, according to an example embodiment of the present invention.

SUMMARY

Figure 6:
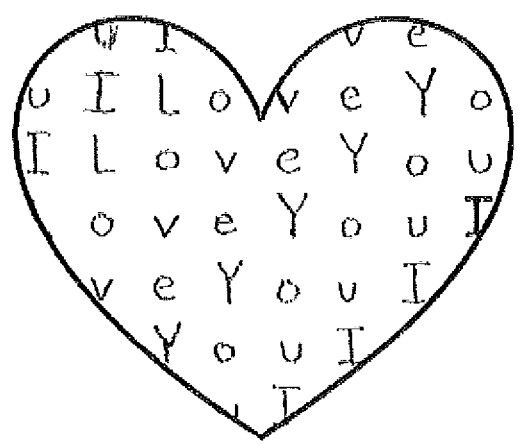

Example embodiments of the present invention provide a method and a device for generating data patterns by repeating a data string, in which a plurality of data elements are ordered in relation to each other, along a plurality of directions to fill a predefined space. The space may be two-dimensional or three-dimensional. Individual elements of the data string may include one of any number of different data types such as text, images and symbols. Data patterns generated in accordance with the example embodiments allow the data string to be intuitively and quickly understood by a viewer, with the visual impact of the data string magnified by the repetition, and with the overall display of the pattern imparting additional meaning to the viewer compared to non-repetitive display.

Example embodiments of the present invention provide for masked display of a data pattern. Masking allows specific portions of the data pattern to be brought to the viewer's attention. Masks may include decorative shapes (e.g., shapes that provide context to the meaning of the data string) in addition to shapes designed to direct the viewer's attention along certain directions, e.g., diagonally.

Data patterns generated according to the example embodiments have wide applicability and may be output for display on a display screen or printed onto a physical object.

DETAILED DESCRIPTION

Example embodiments of the present invention relate to techniques for generating a repeating pattern of data so that the same data is observed when viewed from different directions. The data that is repeated may include different arrangements of letters, words, phrases, sentences, alphanumeric characters, codes, symbols, images, and other data. The different directions may include one or more of a horizontal, a vertical, and a diagonal direction. The data may be represented as repetitions of a data input string that includes a plurality of data elements. The data elements can be any combination of the aforementioned data types, e.g., all letters, letters plus symbols, letters plus images, etc. Although example embodiments are described in connection with English language text, the example embodiments are equally applicable to other languages, including those that use a non-Latin writing system.

In some instances, a grid may be used to align the individual data elements that make up a data string so that the same sequence of individual data elements can be lined up and easily read in multiple directions. The grid may be used temporarily to initially place the data elements. Thereafter the grid may be removed and need not be made visible to a user. The grid may include one or more columns and rows. Each column in each row may contain a single data element, such as a single letter, character, or symbol. The individual data elements that make up a data input may be positioned one after the other in each column of the first row until the first row is filled up. If the number of data elements in the data input is less than the number of columns in the first row, the placement of data input may be repeated by placing additional copies of the individual data elements of the data input one after the other until the first row is filled.

The repeating pattern may be generated by first creating a virtual X-row by Y-column grid using a processing device. The processing device may be configured to iteratively cycle through the data elements of a data input and fill each of the cells in the grid in a predetermined sequence with a respective data element until each of the cells in the grid is filled with one data element. The predetermined sequence may include filling a first cell in a first row and first column of the grid with a first data element in a data input, filling a second cell in the first row and/or column with a second data element, filling a third cell in the first row and/or column with a third data element, and so on, until each of the cells in the first row and/or column are filled with one data element. If the number of cells exceeds the number of data elements in a data input, the process may loop back through the data elements starting with the first data element in the data input until the row and/or column is filled.

Once the first row and/or column has been filled, the process may be repeated with a second row and/or column, with the filling of cells in the second row and/or column starting with the second data element instead of the first as was done in the first row. Each subsequent row and/or column that is filled may be filled starting with a next data element in the data input, with a loop back to the first data element after reaching the last data element in the data input. The process may continue until the entire virtual grid is filled, at which point the arrangement of the data elements in the grid may be outputted to a printer, display, or other output device. In some instances, a mask may be applied to the data elements in the filled in grid so that only a subsection of the data elements and/or filled in grid is outputted to the output device.

In other instances, instead of creating a rectangular grid, a set of row and column vectors may be identified that fit within a bounded area. The bounded area may have a non-rectangular shape, such as an oval, triangular, three-dimensional, or other shape. A plurality of cells may be formed from the intersections of the row and/or column vectors. A processing device may be configured to iteratively cycle through the data elements of a data input and fill each of the cells in a predetermined sequence with a respective data element until each of the cells in the grid is filled with one data element. The data elements may be arranged and/or aligned in the cells so that the data elements of the data input appears continuously one after the other when viewed from multiple directions, such as a horizontal direction along each row vector, a vertical direction along each column vector, and a diagonal direction.

An example of this is shown below in FIG. 1 with respect to the exemplary data phrase "ILoveYou" made up of the eight individual character data elements I, L, o, v, e, Y, o, and u. In this example, spacing and punctuation have been removed from an original input sentence "I Love You!" to form the data input "ILoveYou." In other instances, spaces, punctuation, and other grammatical elements may remain in and need not be removed from the data input. In other instances, one or more data elements in a data input may include symbols, images, animations, videos, and other types of data. For example, the letters L, o, v, e, in the data input "ILoveYou" may be replaced with a heart shape ■ to form the data input "I■You" instead of "ILoveYou" in another embodiment.

The dashed vertical lines delineate the borders of the 16 columns in the first row of the exemplary output shown in FIG. 1. Since the data input "ILoveYou" only includes eight individual data elements, the data elements may be repeated a second time to fill the first row. Different embodiments may include a different number of columns and the data input and/or data elements may be repeated a different number of times to fill the columns. Additionally, instead of initially filling the first row with data elements, in some instances a first column may be filled with data elements, with one data element in each row of the first column. In other instances, the data elements may be filled in a diagonal direction instead of a horizontal direction in a row or a vertical direction in a column.

FIG. 2 shows the individual data elements of a data input being repeated across a first row and down a first column. The dashed vertical and horizontal lines delineate exemplary borders of the respective columns and rows. In this example, there are seventeen rows and sixteen columns. Since the data input consists of eight data elements, the data input may be fully repeated twice down the first column and then only the first data element "I" may be repeated a third time in the last row of the first column. This fragmentation of the data input in the first column and the first row may be avoided by selecting the number of rows and columns to be an integer multiple of the number of data elements in the data input. However, by adding an extra row after selecting a number of rows and columns corresponding to integer multiples of the number of data elements, it is possible to ensure that the data element in the last column of the last row is the last data element in the data input (as shown FIG. 4).

FIG. 3 shows the continued placement of individual data elements in different columns and rows to form the repeating pattern readable when viewed in different directions. For example, ILoveYou is readable when viewed left to right, top to bottom, and top left corner diagonally toward the bottom right. FIG. 3 also shows an exemplary pattern for filling the data elements. For example, the same data elements may be filled in moving diagonally across the pattern. In FIG. 3, the same data element "u" is the last element shown as being filled in a diagonal direction. The process may continue by filling in the "I" in the diagonal direction next to the "u" and so on until the grid is full. In other instances, instead of filling in the data element by moving diagonally, the data elements may be filled in row by row, column by column, left to right, right to left, or in any other order.

Figure 4:
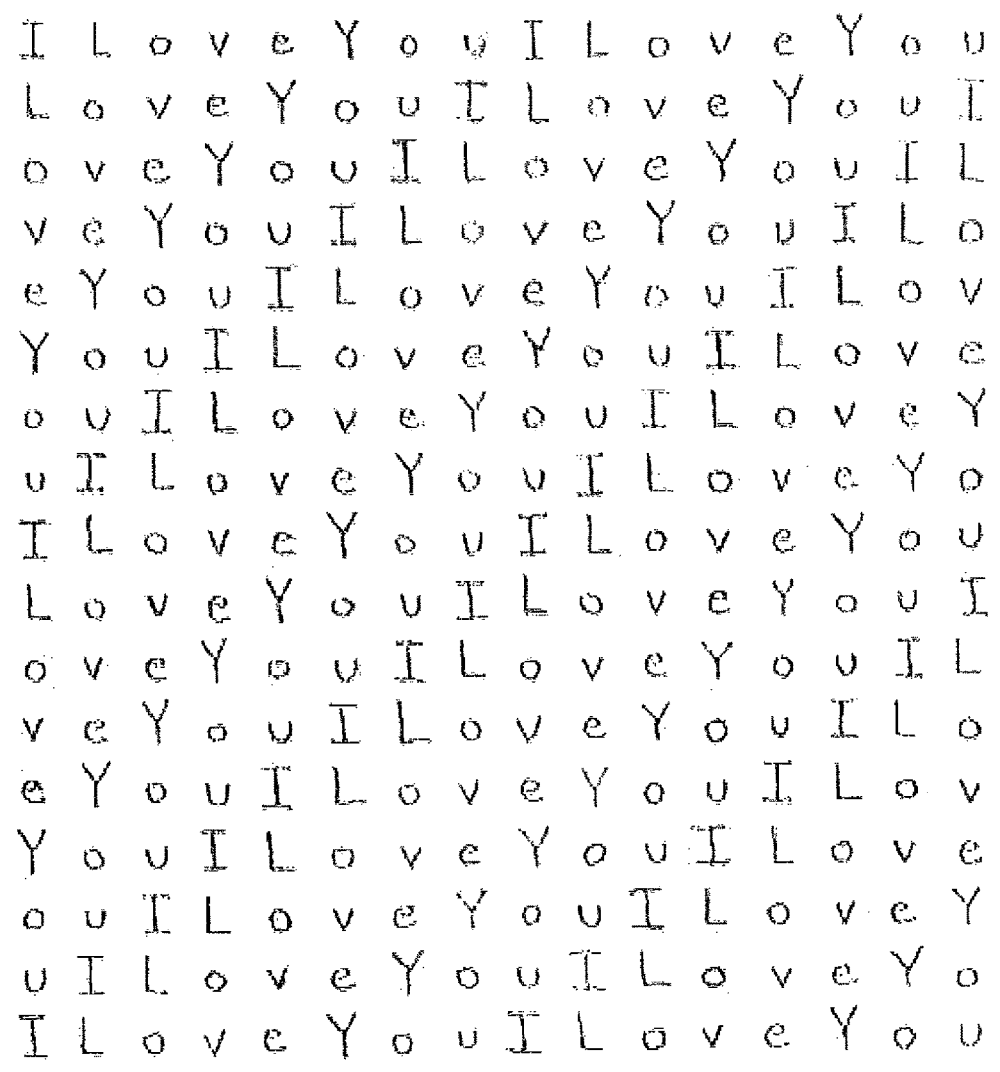

FIG. 4 shows an exemplary result, once the pattern is complete and all of the rows and columns have been filled in with the corresponding data elements. As shown in FIG. 4, the selection of the number of rows and columns based on the number of data elements in a data input may determine the final appearance of the outer edges of the output. Selecting the number of rows to be an integer multiple of the number of data elements and selecting the number of columns to be an integer multiple of the number of data elements plus one may ensure that the data element in the last row and last column of the output is the last data element of the data input. If a different number of rows or columns are selected, the data element in the last row and column may be another data element of the data input.

Figure 5:
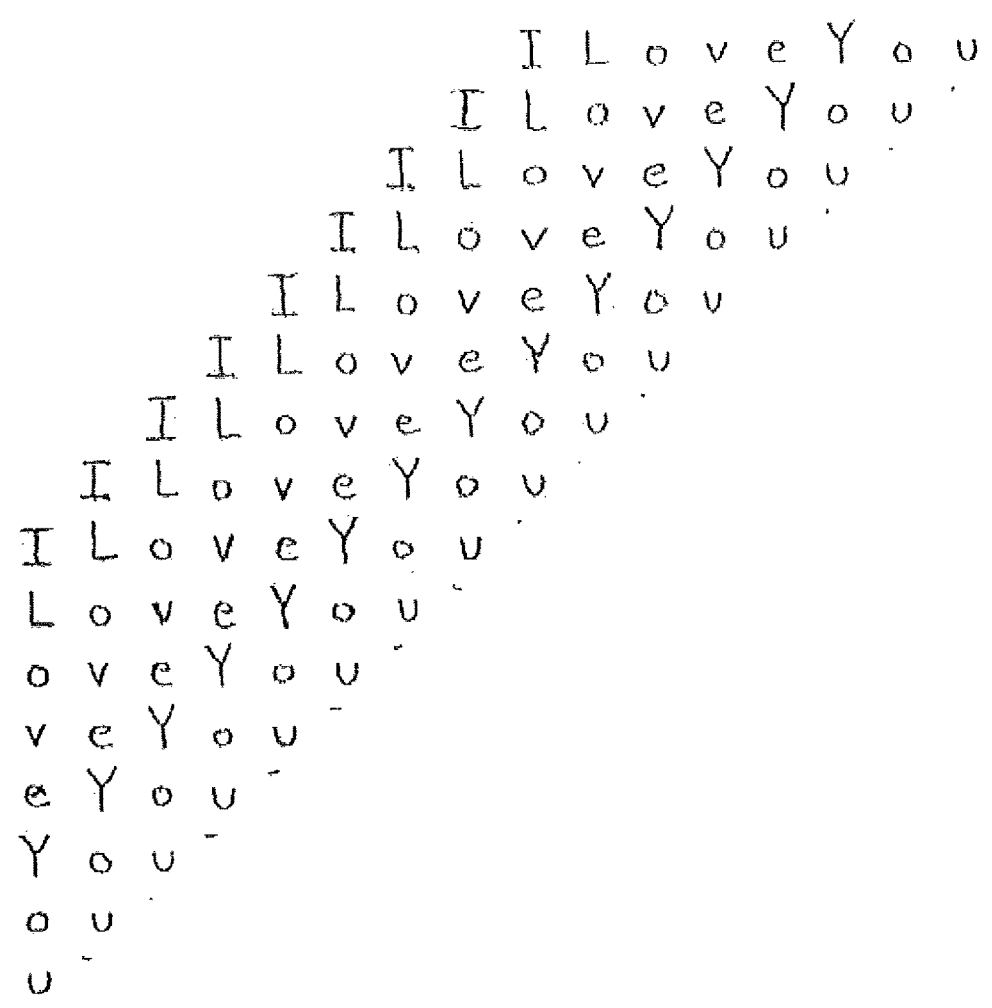
Figure 7A:
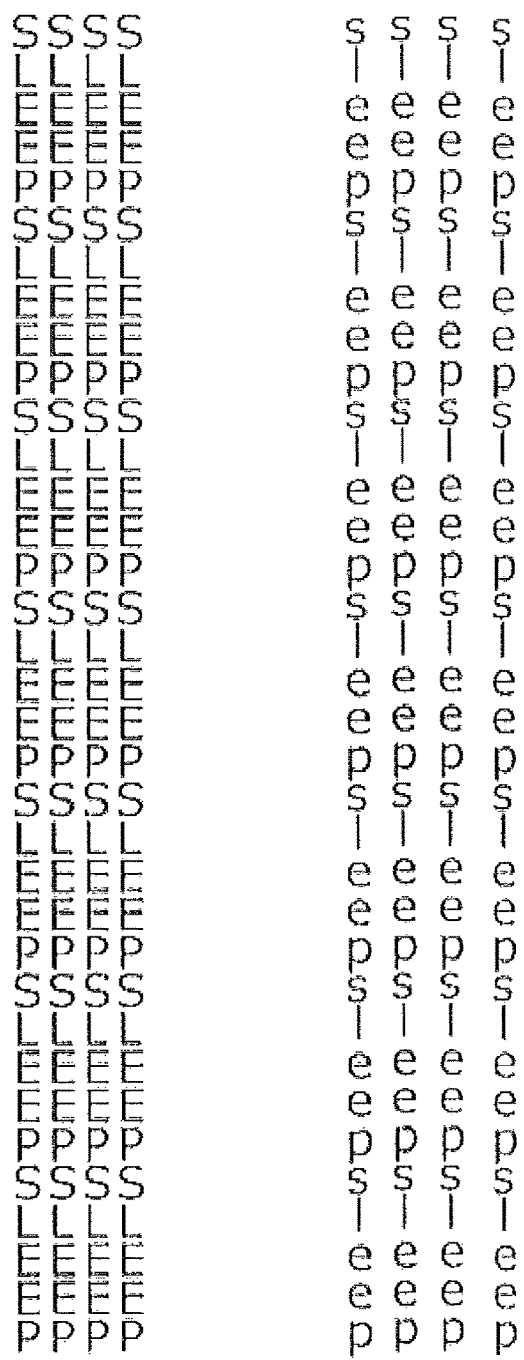
Figure 7B:
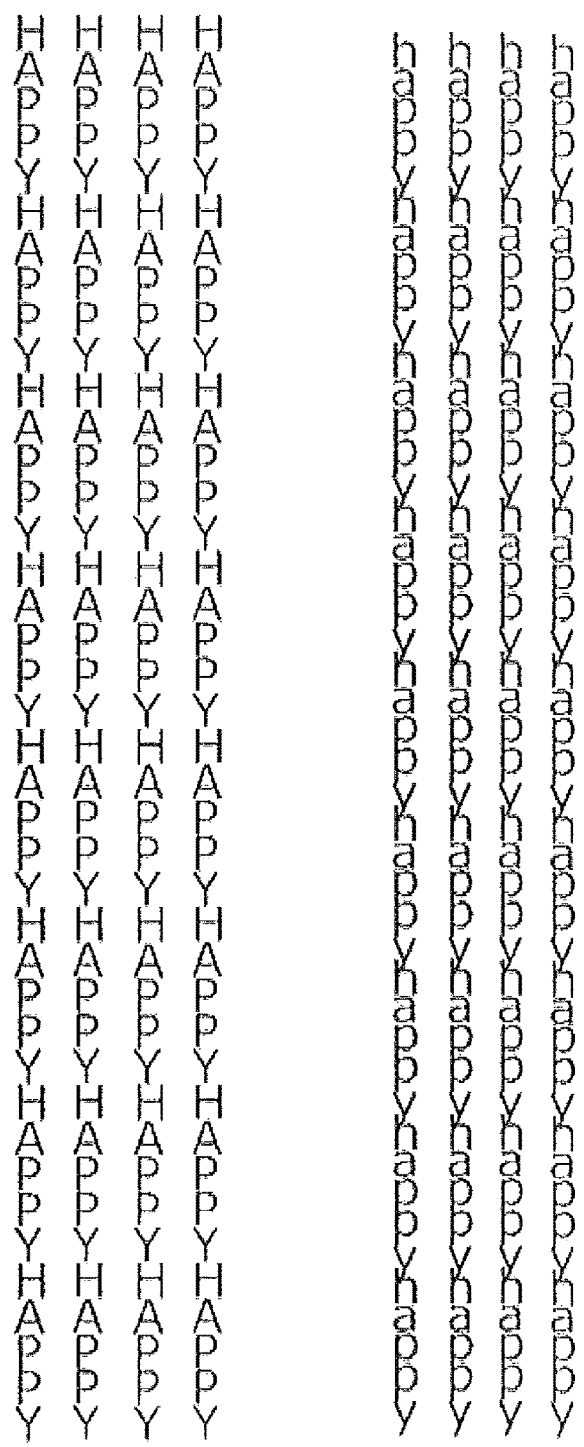

In some instances, a mask may be applied to the completed pattern so that only a designated subset of the data elements is visible. FIG. 5 shows an exemplary mask applied to the pattern shown in FIG. 4 so that only one diagonal strip of a single "ILoveYou" is showing. FIG. 6 shows a second exemplary heart shaped mask so that only those data elements in FIG. 4 that appear within the heart shape are showing. Other types of masks may be applied in other situations. In another example, a mask may be used to restrict the reading of the data elements to certain directions. For example, after generating the data pattern, a striped mask in which the stripes have a specified width (e.g., a width equal to that of a single data element) may be applied so that the data elements are readable only vertically, along each stripe, as shown in FIGS. 7A and 7B. Additionally, by appropriately sizing and/or spacing the data elements and the striped mask, a pin-stripe pattern can be created in which the data is readable only upon close inspection, but appears as solid stripes when viewed at a distance.

Figure 8:
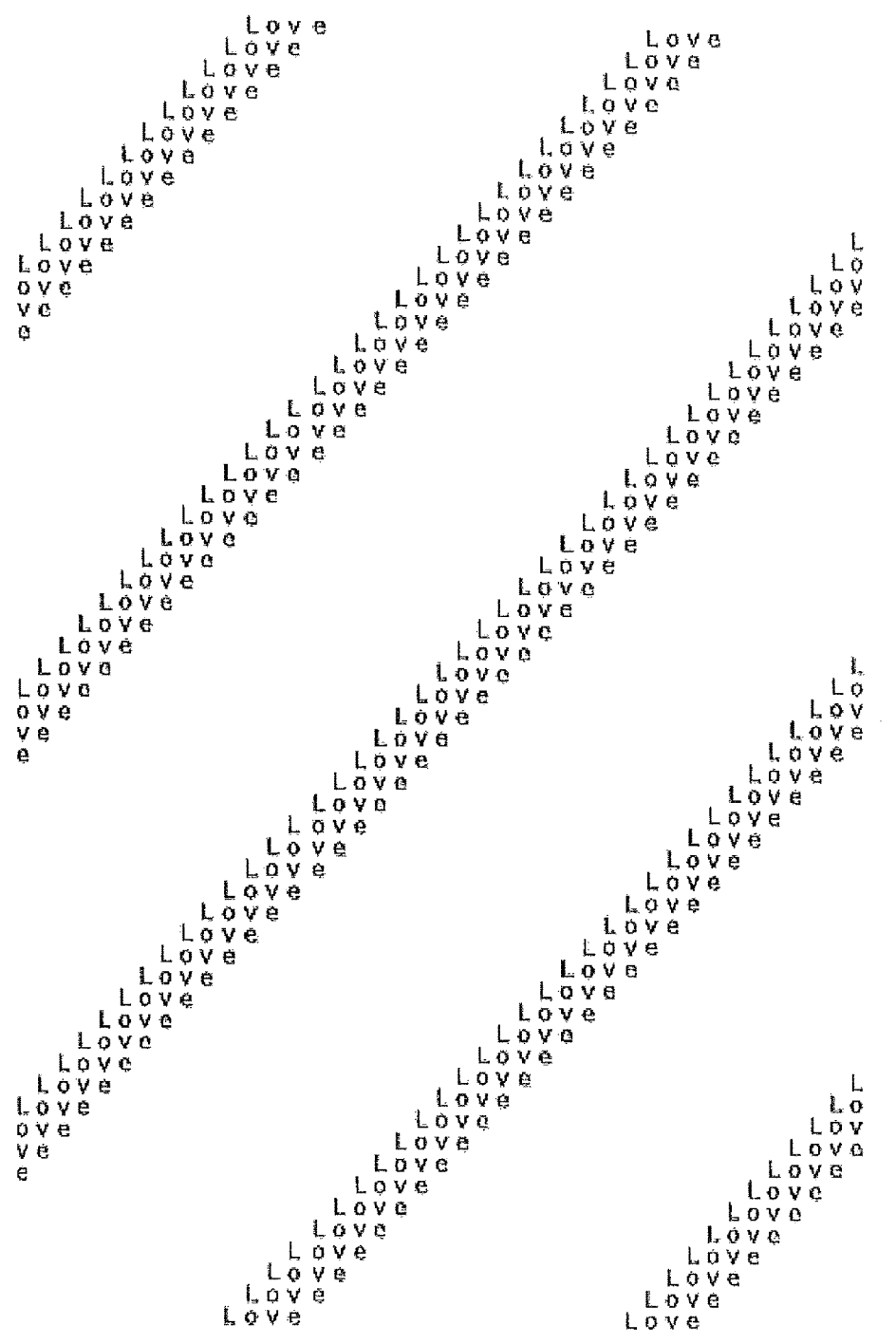

Instead of first populating a grid with multiple copies of data elements as described above and then applying a mask, in some instances the mask may be created first and the grid may be determined according to the mask. FIG. 8 shows an example of a repeating pattern of diagonal strips which are populated with the data input word "Love" as described above so that the data input "Love" can be read in the vertical, horizontal, and diagonal directions.

Figure 9:
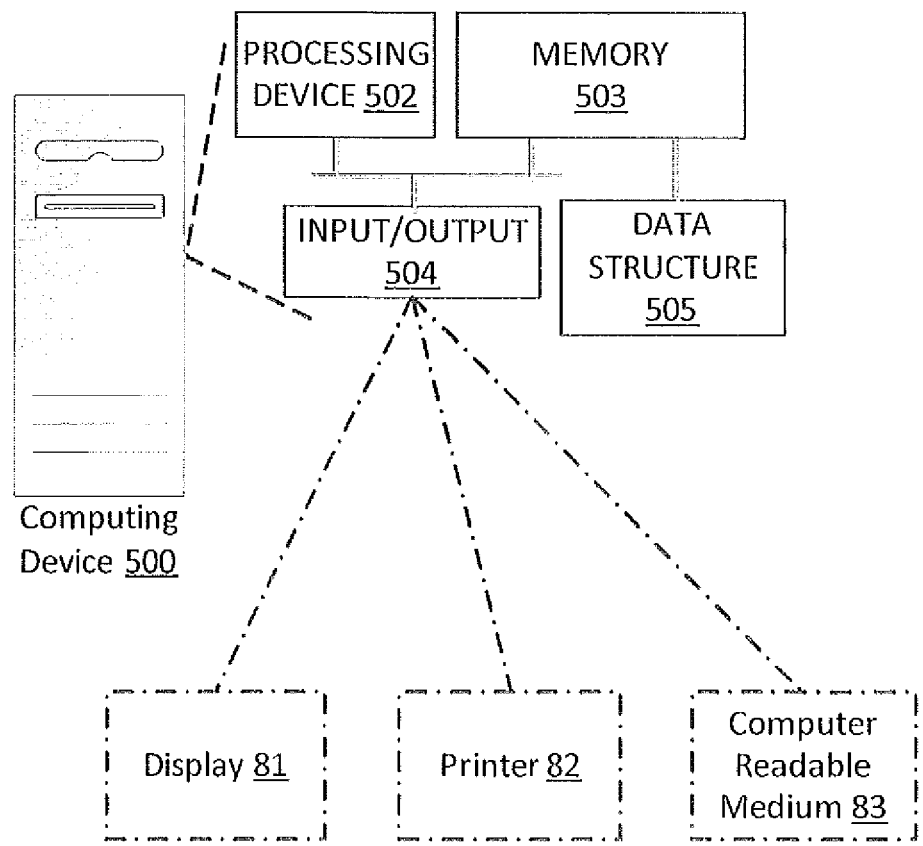
FIG. 9 shows a system for generating a data pattern, according to an example embodiment of the present invention.

FIG. 9 shows an exemplary architecture of a computing device that may be used to generate the above mentioned patterns. A computing device 500 may include a processing device 502, computer readable memory 503, and input and/or output device 504.

Figure 10:
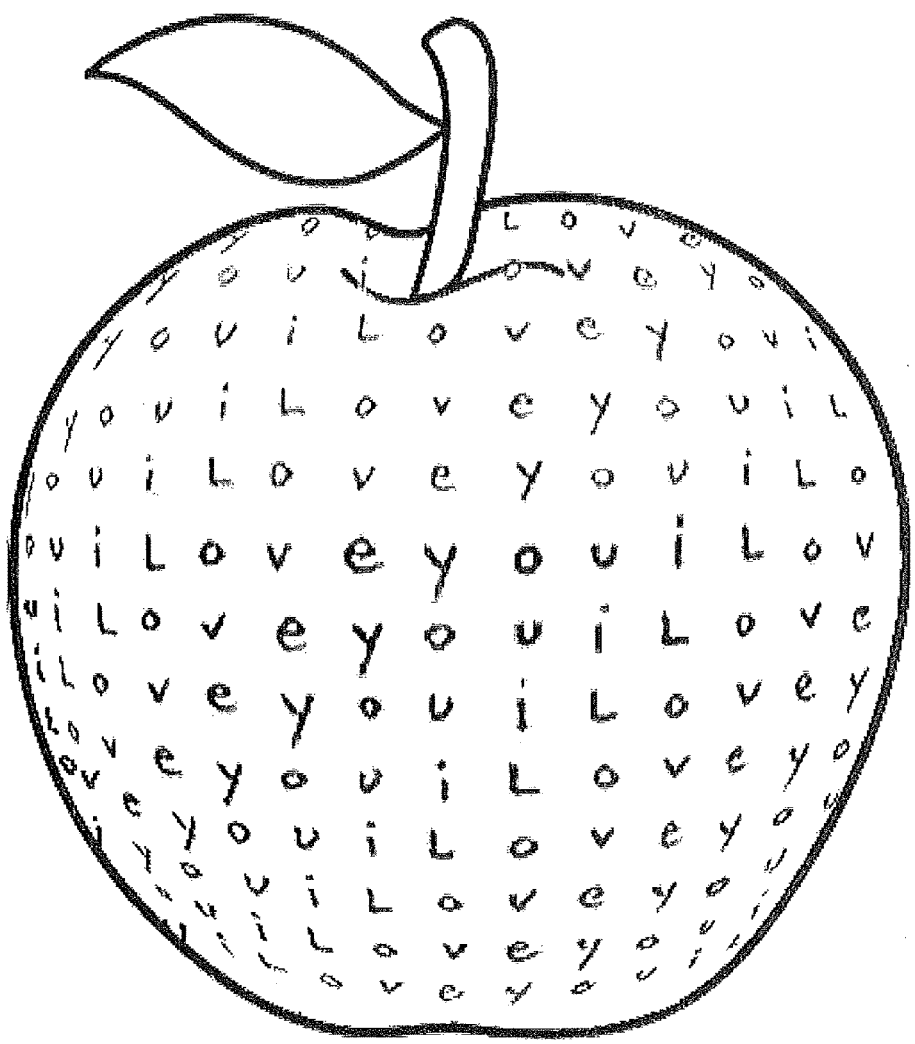
FIG. 10 shows a data pattern on a three-dimensional object, according to an example embodiment of the present invention.

The processing device 502 may be configured to identify one or more data elements of a data input, identify a mask specifying a viewable area, and arrange the one or more data elements on an output to generate the pattern of data elements that are simultaneously viewable from multiple directions as described herein. The processing device 502 may transmit the generated pattern of data elements to the output device 504 and/or memory 503. The output device 504 may be coupled to one or more outputs such as a display device 81, printer 82, or computer readable medium 83. The display device 81 may include any device capable of displaying the generated pattern, such as a monitor, projector, or television. The printer 82 may include any type of device capable of producing the generated pattern on an object, including, but not limited to a two-dimensional or a three-dimensional object, by a mechanical process, such as an inkjet printer, copier, sewing machine, 3D printer, embosser, etcher, and so on. The computer readable medium may include any type of medium capable of non-transitorily storing instructions executable by the processing device 502. An example embodiment of a data pattern on a three-dimensional object is shown in FIG. 10, where "ILoveyou" is repeated across the surface of an apple shaped object.

The memory 503, which may store the generated pattern, masking information, data elements, and/or data structure 505, input/output interface 504, and processing device 502 may be interconnected via a system bus. The output interface 504 may enable communications between the computing device 500 and other output devices 81, 82, and 83 connected to the interface 504.

In an embodiment, memory 503 may contain different components for retrieving, presenting, changing, and saving data and may include the computer readable medium 83. Memory 503 may include a variety of memory devices, for example, Dynamic Random Access Memory (DRAM), Static RAM (SRAM), flash memory, cache memory, and other memory devices. Additionally, for example, memory 503 and processing device(s) 502 may be distributed across several different computers that collectively comprise a system.

Processing device 502 may perform computation and control functions of a system and comprises a suitable central processing unit (CPU). Processing device 502 may include a single integrated circuit, such as a microprocessing device, or may include any suitable number of integrated circuit devices and/or circuit boards working in cooperation to accomplish the functions of a processing device. Processing device 502 may execute computer programs, such as object-oriented computer programs, within memory 503.

Figure 11:
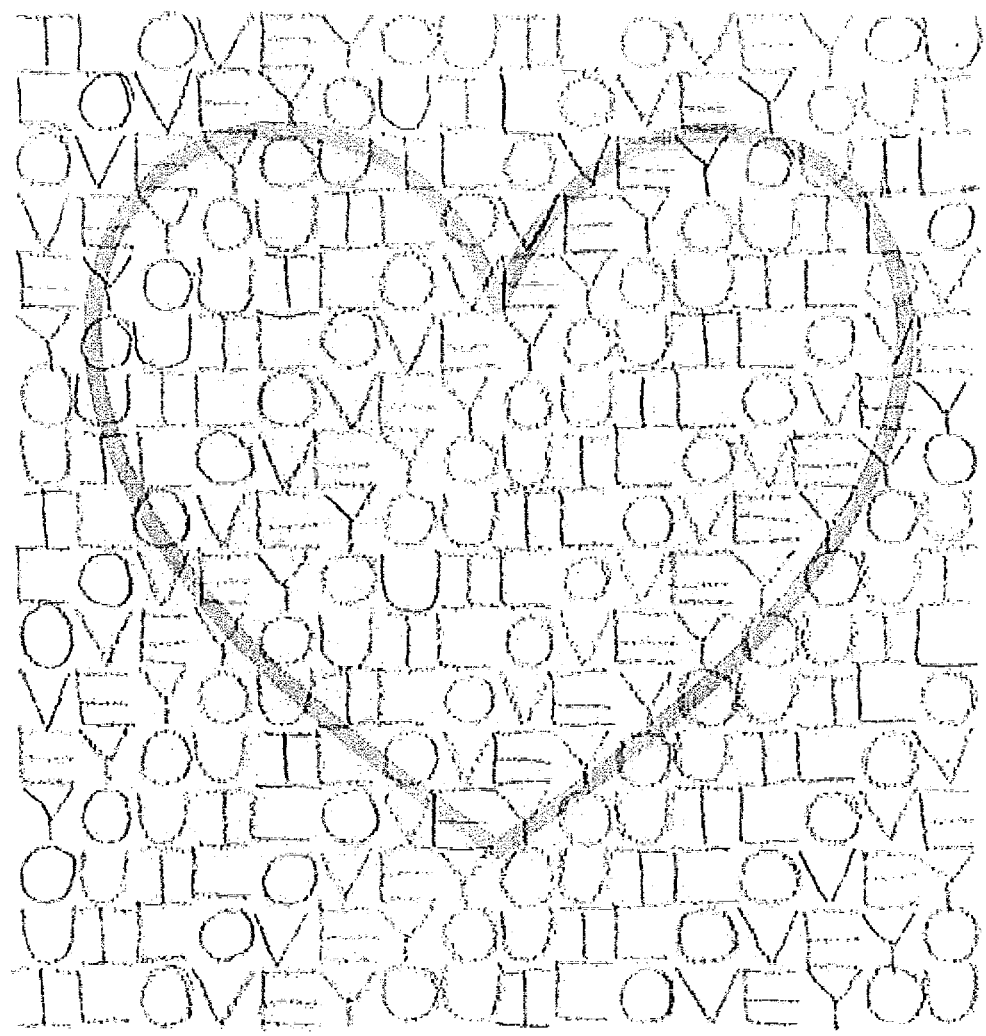
FIG. 11 shows a data pattern overlaid on a background image, according to an example embodiment of the present invention.

FIG. 11 shows another exemplary embodiment in which all capital letters are used and the generated pattern is overlaid on a background instead of applying a mask. The background is shown as a heart image in this example, but in other instances, the background image may be a pattern, scene, design, animation, video, or other object.

Once the patterns have been generated, the patterns may be used in drawings, graphics, paintings, sculptures, silk-screens, lithographs, posters, ceramics, off set and limited editions, animations, multi-media mixed works comprised of all materials including all forms of illumination, in all languages, colors, sizes, and designs. The data elements in a data input may include capital letters, small case letters, combinations of upper and lower case letters, letters inside and outside various shapes such as hearts, circles, squares, in all typefaces and languages, appearing with or without lines between the letters, produced in positive or negative space and created with and without spaces between the words, as well as with the letters of the type touching or not touching each other.

The generated pattern may be included on different materials, walls, floors, ceiling, and two and three-dimensional objects, both indoors and outdoors, as well as three-dimensional sculptures in all shapes for museums, galleries, and public and private spaces worldwide including children's playgrounds. When the pattern is displayed on a display screen, the generated pattern may change and be interactive. For example, an infra-red or other sensor responsive to heat and/or presence may cause a pattern to be displayed or changed. The pattern may be displayed in some instances on neon lit screens or large format billboard-type screens normally devoted to advertising. The pattern may be customized for advertising campaigns including print and television media.

In other instances, an application for a computer or mobile computing device may be developed to generate one or more patterns based on a data input. The generated pattern may be displayed on the device, shared with others, or used to customize a device, such as to set a home screen background. The application may include personalization options with art filters that may be applied to pattern or data input. In an example embodiment, the data pattern is displayed using light-emitting diodes arranged on a surface of a three-dimensional object. The display is made interactive by, for example, including a camera that captures and overlays an image of the viewer onto the data pattern. Interaction may also include receiving, via the application, data input from a user for overlaying onto the data pattern, or as a substitute data string for generating a new pattern in place of a preprogrammed pattern. For example, a user A may cause a message "User A Loves User B" to be transmitted to the computing device 500, which generates a new data pattern for display by substituting "User A Loves User B" for "ILoveYou." The computing device 500 may be programmed to output the new data pattern for display at a user specified time, e.g., a time when the user B is expected to view the display.

The generated pattern may also be included on sheets for children and adults, blankets, baby blankets, pillowcases, duvet covers, throw pillows, quits and bed spreads, mattresses and mattress covers, diapers, diaper hampers and baby accessories such as hair brushes. The generated pattern may also be included on bath mats, shower curtains, towels of all sizes, toilet seat covers, toilet paper and toilet paper holders, paper towel patterns, Band-Aids, sleep masks, tooth brushes and holders, hair accessories such as headbands and barrettes, hair brushes, eye glasses and eye glass cases, perfume and make up bottles, containers for beauty products, make-up purses, travel accessory and garment bags, dish towels, pot holders, aprons, baby bibs, trays, shopping bags, tote bags, salt and pepper shakers, glasses, mugs, thermoses, water bottles, and all forms of dishes and dinnerwear, table cloths, napkins, and place mats, coasters, ash trays, including food storage containers, picture frames and mirrors, clocks, waste baskets, vases in all materials, flower pots, umbrellas, lunch containers, candles, bulletin boards, decorative boxes in all materials for all uses, gift boxes and jewelry boxes, tissue box covers, key chains, shot glasses, chocolate bars, chocolate bar wrappers, playing cards, postcards, magnets, buttons, snow globes, decals, flasks, maps, pet bowls, keepsake boxes, glasses cases, pet beds, postage stamps, writing paper, envelopes, greeting cards, note cards, wrapping paper, ribbons and bows, decorative adhesive tape, blank books, invitations, note pads, diary covers, address books, journals, Post-its®, paper and plastic tablecloths, table runners, plates, bowls, cups, platters, napkins, and other paper and plastic party paraphernalia, pens, pencils, erasers, calendars, toys, stuffed toys and games in all media, stickers, toy boxes, hula hoops, water toys, bathing caps, skate boards, skis, apps that personalize the algorithm for other computer programs and/or video games.

The generated pattern may also be printed, ironed, stitched, or otherwise affixed to fabrics, as well as woven into and through all types of fabrics and clothes including, but not limited to, T-shirts, sweatshirts, men, women, children, baby, infant and pet garments, belts, ties, scarves, gloves, shoes, sneakers, hats, caps, ear muffs, purses, purse linings, back packs, briefcases, wallets, credit card holders and linings, luggage, luggage linings and accessories, specialty clothing for yoga and other sport activities, including yoga mats, blankets and work out clothing, hospital and hospice clothing, including but not limited to gowns, slippers, robes, and scrubs, specialty hotel apparel, such as bathrobes, slippers and other hotel-provided apparel and accessories.

The generated pattern may also be included on all types of chairs, sofas, curtains, draperies, blinds, and other window treatments, ottomans, benches, stools, patio furniture, wall treatments, wall papers, wall coverings, tables, bedboards, armoires, dressers, cabinetry, and other types of furniture.

The generated pattern may also be included on rugs, carpeting, and other floor coverings including tile flooring in all materials, and also including floors lit from underneath that are activated by heat or presence-detection sensors.

The generated pattern may also be included on floor lamps, wall lamps, and desk lamps in all sizes, shapes, and materials, etched or embossed in negative and positive facets, and lamp shades of all shapes and sizes.

The generated pattern may also be included on watch faces, watch bands, bracelets, and charm bracelets, rings including wedding rings, earrings, necklaces, apps, e-books and games for all electronic devices, cell phone covers, screen savers for cell phones and computers, mouse pads, computer covers, website/webpage designs, book cover designs, CD covers, greeting cards, tattoo art, and other materials.

The preceding lists of objects, materials, and devices on which the generated pattern may be applied are not intended to be exclusive and are for exemplary purposes. The generated pattern may also be included on other objects, materials, or devices as well.

Figure 13:
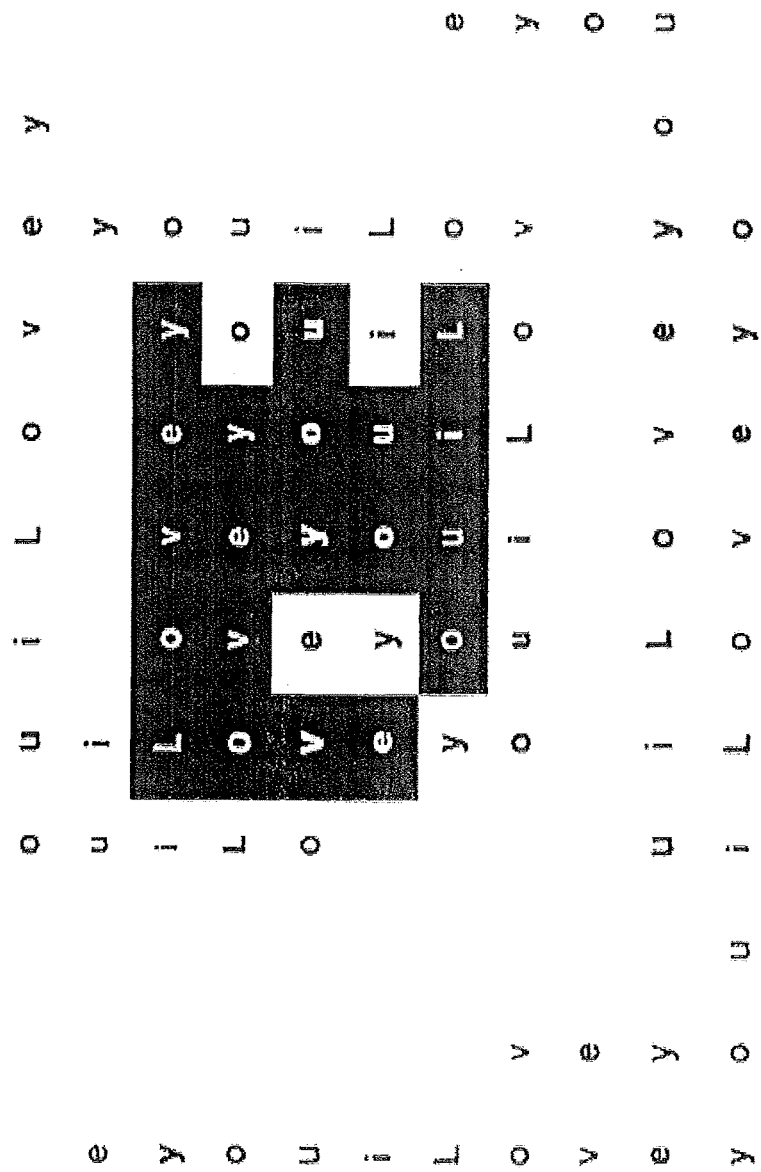
FIG. 13 shows a partially filled data pattern that includes colored backgrounds for certain data elements, according to an example embodiment of the present invention.

When the data pattern is output on an electronic display, instead of showing the complete pattern at once, the display may gradually fill in the pattern, e.g., one data element, one string or one line at a time. Therefore, the data pattern may be displayed as part of an animation that includes visual effects such as zooming in and out of the pattern, changes in the displayed size of the data elements over time, display of the pattern in combination with the application of different masks over time, and using different colors. For example, FIG. 12 shows a data pattern to which a three-dimensional heart-shaped filter has been applied. The processing device performs image processing on the data elements contained within a region of the data pattern delineated by the filter. Image processing may involve any number of visual effects, such as stretching the data elements across a three-dimensional surface of the filter region in order to simulate a magnifying glass effect, as shown in FIG. 12. Data elements can be displayed in the same or different colors. Additionally, each data element may be rendered on the same or different colored backgrounds (e.g., a multi-color mosaic of backgrounds). In FIG. 13, the data elements in the central region of a partially filled pattern include colored backgrounds, whereas data elements outside of the central region do not have colored backgrounds. The partially filled pattern in FIG. 13 may be generated by applying one or more masks to define areas in which no data elements are to be displayed, as previously explained.

Figure 14:
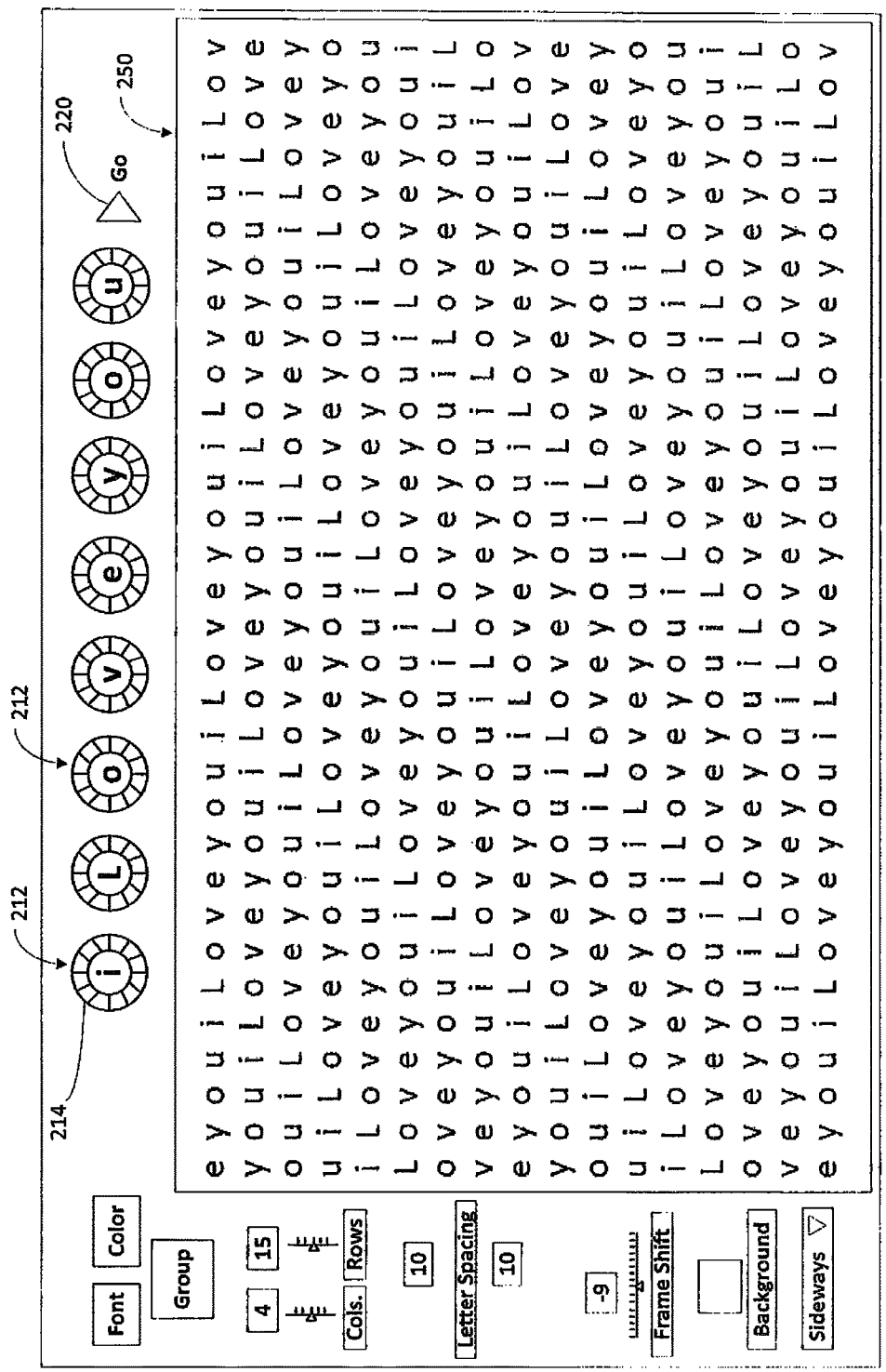
FIG. 14 shows a graphical user interface by which a user inputs parameters for creating a data pattern, according to an example embodiment of the present invention.

FIG. 14 shows a graphical user interface by which a user inputs parameters for creating a data pattern, according to an example embodiment of the present invention. In FIG. 14, each element 212 of the data string "iLoveyou" is displayed at the top of the user interface. Text data can be input by manually typing in the data. Non-text data can be input by selecting from a set of images or symbols, or uploading an image file from the users computer. A color wheel 214 is provided within each data element and allows the user to quickly select a color of each individual element by clicking on a colored segment of the wheel. The left side of the user interface includes options for specifying font size, additional color parameters, the number of rows or columns, letter spacing, row spacing, overall background color, and pattern orientation (e.g., sideways or vertical). Options are also available for grouping a plurality of elements into a single element (e.g., combining a series of letters into a single data element) and shifting the entire data pattern in a particular direction (frame shift). Upon user activation of a "Go" button 220, the data pattern is generated and displayed in a preview frame 250.

An example embodiment of the present invention is directed to one or more processors, which can be implemented using any conventional processing circuit and device or combination thereof, e.g., of a CPU, to execute code provided, e.g., on a hardware computer-readable medium including any conventional memory device, to perform any of the methods described herein, alone or in combination.

An example embodiment of the present invention is directed to a non-transitory, hardware computer-readable medium, on which are stored instructions executable by a processor to perform any one or more of the methods described herein.

The above description is intended to be illustrative, and not restrictive. Those skilled in the art can appreciate from the foregoing description that the present invention may be implemented in a variety of forms, and that the various embodiments can be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and appendices.

What is claimed is:

1. A computer-implemented method for generating a data pattern, the method comprising:
    receiving, by a computer processor, user input of a plurality of ordered data elements; determining, by the processor, how many of the data elements are required for filling in a row and a column of a predefined space;
    generating, by the processor, a data pattern by iteratively cycling through the data elements to select data elements for filling the space along a plurality of directions'
    wherein a total number of columns in the space is equal to a first integer multiple of a total number of data elements in the user input, and a total number of rows in the space is equal to one plus a second integer multiple of the total number of data elements in the user input.

2. The method of claim 1, wherein the space is filled such that the order of the data elements is preserved along the horizontal, vertical and diagonal directions.

3. The method of claim 1, wherein the space is filled according to a mask that specifies areas of the space in which no data elements are to be placed.

4. The method of claim 3, wherein the space is filled by populating areas corresponding to the mask with the data elements.

5. The method of claim 1, further comprising;
    identifying, by the processor, a set of column vectors that fit within a bounded area delineated by the space.

6. The method of claim 1, wherein the space is three-dimensional.

7. The method of claim 1, wherein the data elements include at least one of still images, animations and videos.

8. The method of claim 1, further comprising:
    overlaying an image onto the data pattern.

9. The method of claim 1, further comprising:
    outputting, by the processor, the data pattern for display at an electronic display screen; and
    changing the data pattern in response to a sensor-based detection of a viewer's presence.

10. The method of claim 1, wherein said first and second integers are equal.

11. A device for generating a data pattern, the device comprising:
    a computer processor that:
    receives user input of a plurality of ordered data elements; determines how many of the data elements are required for filling in a column and row of a predefined space; and
    generates a data pattern by iteratively cycling through the data elements to select data elements for filling the space along a plurality of directions,
    wherein a total number of columns in the space is equal to a first rows integer multiple of a total number of data elements in the user input, and a total number of rows in the space is equal to one plus a second integer multiple of the total number of data elements in the user input.

12. The device of claim 11, wherein the processor fills the space such that the order of the data elements is preserved along the horizontal, vertical and diagonal directions.

13. The device of claim 11, wherein the processor fills the space according to a mask that specifies areas of the space in which no data elements are to be placed.

14. The device of claim 13, wherein the processor fills the space by populating areas corresponding to the mask with the data elements.

15. The device of claim 11, wherein the processor identifies a set of column vectors that fit within a bounded area delineated by the space.

16. The device of claim 11, wherein the space is three-dimensional.

17. The device of claim 11, wherein the data elements include at least one of still images, animations and videos.

18. The device of claim 11, wherein the processor overlays an image onto the data pattern.

19. The device of claim 11, wherein the processor:
    outputs the data pattern for display at an electronic display screen; and changes the data pattern in response to a sensor-based detection of a viewer's presence.

20. The device of claim 11, wherein said first and second integers are equal.

* * * * *